United States Patent Office 3,515,746
Patented June 2, 1970

3,515,746
TRICYCLIC ACIDS
William Laszlo Bencze, New Providence, N.J., assignor to Ciba Corporation, New York, N.Y., a corporation of Delaware
No Drawing. Continuation-in-part of application Ser. No. 612,345, Jan. 30, 1967. This application Oct. 30, 1967, Ser. No. 679,153
Int. Cl. C07c 65/14, 69/76
U.S. Cl. 260—473                     16 Claims

ABSTRACT OF THE DISCLOSURE

Tricyclic phenoxy-acids, e.g. those of the formula

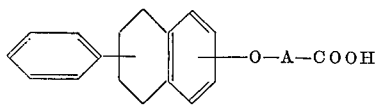

A=alkylene or alkenylene and their functional derivatives are hypocholesterolemic agents.

CROSS-REFERENCES TO RELATED APPLICATIONS

This is a continuation-in-part of application Ser. No. 612,345, filed Jan. 30, 1967.

SUMMARY OF THE INVENTION

The present invention concerns and has for its object the provision of tricyclic phenoxy-acids of the Formula I,

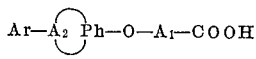

in which each of $A_1$ and $A_2$ stands for lower alkylene or alkenylene, the latter of which forming with Ph a 5- to 7-membered ring, Ph for a 1,2-phenylene radical and Ar for a monocyclic carbocyclic or monoaza-, -oxa- or -thia-cyclic aryl radical, of their functional derivatives, as well as of corresponding pharmaceutical compositions and of methods for the preparation of these products. Said compositions are useful hypocholesterolemic agents bringing about an amelioration of certain syndromes, such as those caused by arteriosclerosis.

DESCRIPTION OF THE PREFERRED EMBODIMENTS

A lower alkylene radical $A_1$ preferably is methylene or 2,2-propylene, but also, for example, 1,1- or 1,2-ethylene, 1,1-, 1,2-, or 1,3-propylene, 1,1-, 1,2-, 2,2-, 1,3-, 2,3- or 1,4-butylene, 1,1-, 1,3-, 3,3- or 2,4-pentylene, 3,3- or 3,4-hexylene, or 4,4-heptylene. A lower alkenylene radical $A_1$ is, for example, ethenylene, 1,2-, 2,3- or 1,3-propenylene, 1,4-butenylene, 1,4- or 2,3-but-2-enylene, 2,3-pent-2-enylene, 1,3-hex-2-enylene or 1,1-hept-3-enylene. The lower alkylene or alkenylene radical $A_2$ preferably is 1,4-butylene or 1,4-butenylene, but also one of those groups listed for $A_1$, provided it forms with the ortho positions of Ph a 5- to 7-membered ring. The term "lower," referred to above and hereinafter in connection with organic radicals or compounds respectively, defines such with up to 7, preferably up to 4, carbon atoms.

The 1,2-phenylene radical Ph, carrying the acid moiety in any of the remaining positions, is unsubstituted or substituted in the other 3 positions by one or more than one of the same or of different substituents, such as lower alkyl, e.g. methyl, ethyl, n- or i-propyl, n- or i-butyl, lower alkoxy, e.g. methoxy, ethoxy, n- or i-propoxy or -butoxy, halogeno, e.g. fluoro, chloro or bromo, trifluoromethyl or amino, preferably di-lower alkylamino, e.g. dimethylamino or diethylamino.

The aryl radical Ar is preferably phenyl or phenyl substituted as shown for Ph, but also, for example, 2-, 3- or 4-pyridyl, 2- or 3-furyl or -thienyl or such radical substituted by lower alkyl. It substitutes any ring-carbon atom of $A_2$.

Functional derivatives of the acids of Formula I are preferably their esters, for example, their lower alkyl, e.g. methyl, ethyl, n- or i-propyl, n-, i-, sec. or tert. butyl esters, or substituted lower alkyl, particularly tert. amino-lower alkyl or lower alkoxy-lower alkyl esters, in which the amino or alkoxy group is separated from the carboxy oxygen by at least 2 carbon atoms, preferably by 2 or 3 carbon atoms. A tertiary amino group is above all di-lower alkylamino, e.g. dimethylamino or diethylamino, lower alkyleneimino, e.g. pyrrolidino or piperidino, or mono-, aza- or oxa-lower alkyleneimino, such as piperazino, 4-lower alkyl-piperazino, e.g. 4-methyl- or 4-ethyl-piperazino, or morpholino. Other functional derivatives of the acids of Formula I are, for example, unsubstituted or substituted amides, e.g. mono- or di-lower alkylamides, lower alkyl-eneamides or the nitrile.

The compounds of this invention possess valuable pharmacological properties. For example, they cause a reduction of the cholesterol level in the blood, as can be demonstrated in animal tests using, for example mammals, e.g. rats, as test objects. Besides the above-mentioned utility, the compounds of this invention are also useful intermediates in the preparation of other valuable products, especially of pharmacologically active compounds.

Particularly useful are the compounds of Formula I, in which $A_1$ stands for lower alkylene, $A_2$ for lower alkylene or 1-alkenylene forming with Ph a 5- to 7-membered ring, Ph for 1,2 - phenylene, (lower alkyl) - 1,2-phenylene, (lower alkoxy)-1,2-phenylene, (halogeno)-1,2 - phenylene, (trifluoromethyl)-1,2 - phenylene or (di-lower alkylamino)-1,2 - phenylene, and Ar for phenyl, (lower alkyl) - phenyl, (lower alkoxy) - phenyl, (halogeno)-phenyl, (trifluoromethyl)-phenyl, (di-lower alkylamino) - phenyl, pyridyl, (lower alkyl) - pyridyl, furyl, (lower alkyl)-furyl, thienyl or (lower alkyl)-thienyl, the lower alkyl, lower alkoxy-lower alkyl, di-lower alkylamino - lower alkyl, lower alkyleneimino - lower alkyl, mono-, aza- or oxa-lower alkyleneimino-lower alkyl esters thereof in which the hetero atoms are separated by at least 2 carbon atoms, and salts of the compounds having salt-forming groups.

Preferred compounds of the invention are those of Formula II.

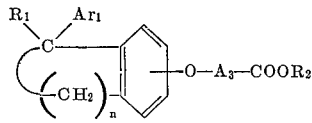

II in which $A_3$ stands for alkylene with 1 to 4 carbon atoms, $n$ for the integer from 2 to 4, $R_1$ for hydrogen or methyl, $Ar_1$ for phenyl, (lower alkyl)-phenyl, (lower alkoxy)-phenyl, (halogeno) - phenyl, (trifluoromethyl) - phenyl, (di - lower alkylamino) - phenyl, pyridyl, (lower alkyl)-pyridyl, furyl, (lower alkyl) - furyl, thienyl or (lower alkyl)-thienyl and $R_2$ for hydrogen, lower alkyl, lower alkoxy-lower alkyl, di-lower alkylamino-lower alkyl or lower alkyleneimino-lower alkyl in which the hetero atoms are separated by at least 2 carbon atoms, and salts of the compounds having salt-forming groups, as well as those of Formula III

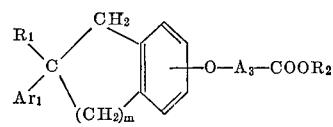

II in which m stands for the integer from 1 to 3 and $R_1$, $R_2$, $A_3$ and $Ar_1$ have the meaning given above, and salts of the compounds having salt-forming groups.

Especially valuable are those compounds of Formulae II and III in which $A_3$ stands for methylene or 2,2-propylene, n for the integer 3, m for the integer 2, each of $R_1$ and $R_2$ for hydrogen and $Ar_1$ for phenyl, 4-methoxy- or 4-chloro-phenyl, their lower alkyl esters, alkali metal and ammonium salts, which, when given at oral doses between about 0.1 and 50 mg./kg./day, preferably between 1.0 and 25 mg./kg./day, to rats, which are either on a normal or high cholesterol diet, show outstanding hypocholesterolemic activity.

The compounds of this invention are prepared according to methods known per se. For example, they are obtained by:

(a) converting in a compound of the Formula IV

IV in which X is a substituent capable of being converted into the group —O—$A_1$—Y, wherein Y is a free or functionally converted carboxyl group, the substituent X into said group —O—$A_1$—Y, or (b) reacting the ketone of the Formula V

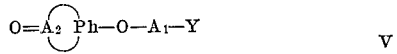
V with an Ar-metal compound under dehydrating conditions, or (c) reducing in the ketone of the Formula VI

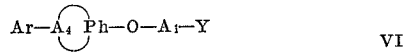
VI in which $A_4$ stands for lower alkanoylene or alkenoylene, forming with Ph a 5- to 7-membered ring, the carbonyl group, if desired under dehydrating conditions, to methylene or methylidene, or (d) ring-closing the compound of the Formula VII

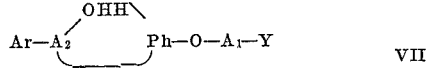
VII or a reactive ester thereof and, if desired, converting any resulting compound into another compound of the invention.

In the starting material of Formula IV, the substituent X may be converted into the group —O—$A_1$—Y in one step or in stages. A particular suitable substituent X is the hydroxy group. The conversion of the corresponding phenolic intermediate into the desired final product is carried out, for example, by converting the phenol first into a salt, particularly a metal salt, such as an alkali metal, e.g. lithium, sodium or potassium salt, for example, with the use of an alkali metal, its hydroxide, carbonate, hydride, amide, alkoxide or an organic alkali metal compound, e.g. sodium or potassium hydroxide or carbonate, lithium or sodium hydride, sodium or potassium amide, lithium, sodium or potassium methoxide, ethoxide or tert. butoxide, butyl or phenyl lithium. The resulting salt may then be reacted with a reactive ester of the alcohol HO—$A_1$—Y, for example that of a strong mineral acid, particularly a hydrohalic acid, e.g. hydrochloric or hydrobromic acid, a sulfuric or sulfonic acid, such as a lower alkane or benzene sulfonic acid, e.g. methane, ethane or p-toluene sulfonic acid. The formation of the metal salt may also be carried out in situ, i.e. the corresponding phenol and the reactive ester are reacted together in the presence of a metal salt-forming reagent, e.g. potassium carbonate. The conversion of a free hydroxy group X may also be carried out by reacting the corresponding starting material with the alcohol

HO—$A_1$—Y in the presence of a disubstituted carbonate, for example, a diaryl e.g. diphenyl carbonate or especially a dilower alkyl, e.g. dimethyl or diethyl carbonate. This reaction is advantageously carried out at an elevated temperature, ranging between about 100° and 210°, preferably between about 180° and 200°, if desired, in the presence of a transesterification catalyst, e.g. sodium or potassium carbonate or a sodium lower alkanolate and preferably in the absence of a diluent. A further modification of the conversion of a hydroxy group X into the group —O—$A_1$—Y comprises the reaction of said phenol with a corresponding aliphatic aldehyde or ketone in the presence of a tri- or tetrahalogenated methane derivative and a strong base. The former is advantageously chloroform, but also, for example, 1,1,1-trichloroacetone, bromoform, 1,1,1-tribromoacetone, iodoform, chloral, chloral hydrate, bromal or bromal hydrate, and the latter carbon tetrachloride or tetrabromide. The strong base used is paticularly an alkali metal hydroxide, e.g. sodium or potassium hydroxide. The reaction is advantageously carried out in the presence of a diluent, which may be furnished by an excess of the aldehyde or ketone reagent. A further substituent X capable of being converted into the group —O—$A_1$—Y is that of the formula

—O—CO—$R_3$ in which $R_3$ stands for esterified or etherified hydroxy, for example, halogeno, particularly chloro or bromo, or lower alkoxy, e.g. methoxy or ethoxy, as well as phenoxy. The corresponding starting material is reacted with the compound HO—$A_1$—Y, advantageously under the conditions previously mentioned for the reaction with the disubstituted carbonates.

The Ar-metal compound mentioned under item (b) may be, for example, a Grignard or alkali metal, e.g. lithium or sodium compound. The condensation is carried out under the known conditions, during which usually dehydration occurs. The latter preferably takes place under the acidic conditions required for the decomposition of the metal complex and/or elevated temperatures.

The reduction of the ketone of Formula VI may either be performed with the use of an aliphatic metal compound analogous to that shown under (b), or with other ketone reducing agents yielding the corresponding alcohols, which subsequently are dehydrated, advantageously under acidic conditions. Said reducing agents are, for example, catalytically activated or nascent hydrogen, aliphatic metal compounds or metal hydrides, e.g. alkyl Grignard or alkali metal compounds, simple or complex alkali-metal hydrides, e.g. sodium hydride, lithium aluminum hydride or sodium borohydride, alcohols in the presence of aluminum alkoxides, e.g. isopropanol and aluminum isopropoxide and the like. In said ketones of Formula VI, the carbonyl group may also be reduced to the methylene group, e.g. by catalytic hydrogenation or according to the Clemmensen or Wolff-Kishner procedures, i.e. with amalgamated zinc and an acid, e.g. hydrochloric acid, or with hydrazines in the presence of a base, e.g. hydrazine hydrate and potassium hydroxide.

The cyclization of the compounds of Formula VII is advantageously performed in the presence of a dehydrating agent, such as sulfuric acid or phosphorus pentoxide or oxychloride. A reactive ester of said compounds, e.g. that of a hydrohalic or sulfonic acid, may also be cyclized under basic conditions.

In a resulting compound having a free carboxyl group, such group is converted into a functionally converted carboxyl group according to known procedures, for example, by treatment with an alcohol, such as a lower alkanol, in the presence of an esterifying agent, e.g. hydrochloric or sulfuric acid, or with a corresponding diazo compound. The carboxylic acid can also be converted into its halide, e.g. chloride, and the latter is reacted with an alkali metal, e.g. sodium or potassium alcoholate, such as a lower alkoxide ammonia, a primary or secondary amine, in order to yield esters or amides respectively. A carboxylic acid salt, e.g. the sodium or potassium salt, may also be reacted with a reactive ester of an alcohol, such as an aliphatic halide, e.g. a lower alkyl halide or tert. amino-lower alkyl halide. An ammonium salt of said acids can be dehydrated, for example, by treatment with phosphorus pentoxide or oxychloride, in order to yield the amide, which may be further dehydrated to yield the corresponding nitrile. In resulting compounds containing a functionally converted carboxyl group, this group can be converted into a free or another converted carboxyl group by known methods. For example, resulting esters can be hydrolyzed, advantageously by treatment with a base, e.g. sodium or potassium hydroxide. A nitrile or amide can be converted into the free acid by hydrolysis with either a strong base or acid, e.g. sulfuric acid. Furthermore, a resulting ester can be transesterified for example, by treatment with an alcohol, e.g. a lower alkanol, in the presence of a metal alcoholate, e.g. sodium, potassium or aluminum lower alkoxide, an alkali metal cyanide, or benzyl trimethyl ammonium hydroxide. A resulting ester can also be converted into an amide, for example, by treatment with ammonia, a primary or a secondary amine, if necessary, under increased pressure. A resulting nitrile can also be converted into a corresponding ester, for example, by treatment with an alcohol, e.g. a lower alkanol, in the presence of a suitable mineral acid, e.g. sulfuric or hydrochloric acid. Any resulting compound in which $A_1$ and/or $A_2$ is alkenylene can be converted into the corresponding saturated compound, for example, by treatment with catalytically activated or nascent hydrogen, such as hydrogen in the presence of a nickel, palladium or platinum catalyst; or hydrogen generated during electrolysis or the action of metals on acids or alcohols.

A resulting acid can be converted into its salts according to conventional methods, for example, by reacting it with an about stoichiometric amount of a suitable salt-forming reagent, such as ammonia, an amine or an alkali or alkaline earth metal hydroxide, carbonate or hydrogen carbonate. A salt of this type can be reconverted into the free acid by treatment with an acid, e.g. hydrochloric, sulfuric or acetic acid. A resulting compound containing a basic group, such as an amino group, can be converted into a corresponding acid addition salt, for example by reacting it with an inorganic or organic acid, such as a therapeutically useful acid, or with a corresponding anion exchange preparation, and isolating the desired salt. The latter may be converted into the free compound by treatment with a base, e.g. a metal hydroxide, ammonia or a hydroxyl ion exchange preparation. Therapeutically useful acids are, for example, inorganic acids, e.g. hydrochloric, hydrobromic, sulfuric, phosphoric, nitric or perchloric acid, aliphatic, alicyclic, araliphatic, aromatic or heterocyclic carboxylic or sulfonic acids, for example, formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, aminosalicylic, embonic, nicotinic, methanesulfonic, ethanesulfonic, hydroxyethanesulfonic, ethylenesulfonic, halogenbenzene-sulfonic, toluenesulfonic, naphthalenesulfonic and sulfanilic acid; methionine, tryptophan, lysine and arginine.

These or other salts, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

Resulting mixtures of isomers can be separated into the single isomers according to known methods. For example, geometrical or optical isomers may be separated into the single isomers by exploiting physiocochemical differences, such as differences in solubility or different boiling points between such compounds. Racemates are resolved into the antipodes according to conventional resolution procedures.

The above reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure.

The invention also comprises any modification of the above process, wherein a compound resulting as an intermediate at any stage thereof, is used as starting material and the remaining steps are carried out or the process is discontinued at any stage thereof, or in which the starting material is formed under the reaction conditions or is used in the form of its salts or reactive derivatives. Those starting materials are preferably used, which lead to final products indicated above as being the preferred embodiments of the invention.

The starting material used is known or, if new, may be prepared according to methods known per se. For example, that of Formula IV can be prepared analogous to the method shown under item (b) or by reaction of compounds of the formulae

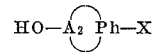

and Ar—H, wherein Ar advantageously is substituted, in the presence of an acidic catalyst, such as sulfuric or phosphoric acid or aluminum chloride. Instead of the free phenols (X=OH), also suitable phenol ethers may be chosen, which can be hydrolyzed after the above-mentioned condensations, for example, with pyridine hydrochloride. Resulting phenols in which Ph contains more than one hydroxy group, may be partially etherified, for example, by reacting it with the proper amount of sodium hydroxide, followed by a reactive ester of a lower alkanol, e.g. a lower alkyl bromide, whereby starting material of Formula IV is obtained in which Ph stands, for example, for (lower alkoxy)-1,2-phenylene and X for hydroxy. The compounds of Formula V can be prepared analogous to the method shown under item (a), e.g. by etherifying the corresponding phenolate with a reactive ester of the formula HO—$A_1$—Y. The starting material of Formula VI can be prepared by cyclization of the corresponding (Ar, Z-Ph)-alkanoic or -alkenoic acids, in which Z stands for hydroxy, lower alkoxy or the radical Y—$A_1$—O—, advantageously their halides, according to the Friedel-Crafts procedure. The alcohols or enols of Formula VII can analogously be prepared from (Z-Ph)-alkanoic or -alkenoic acid halides and aromatic compounds or their metal derivatives. If desired, resulting ketones are reduced to the corresponding alcohols with the agents mentioned for item (c). In resulting compounds in which Z stands for lower alkoxy, this group is then converted into hydroxy as shown above, which latter group is etherified analogous to the method described under item (a).

The compounds of the invention can be used, for example, for the manufacture of pharmaceutical compositions containing them in conjunction or admixture with inorganic or organic, solid or liquid pharmaceutical excipients, suitable for enteral or parenteral administration. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols and other known excipients. The compositions may be, for example, in solid form as tablets, dragées or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions are prepared by conventional methods and contain about 0.1 to 75%, more particularly 1 to 50%, of the active ingredient. They are also included within the scope of the present invention.

The following examples are intended to illustrate the invention and are not to be construed as being limitations thereon. Temperatures are given in degrees centigrade and all parts wherever given are parts by weight.

EXAMPLE 1

To the stirred mixture of 6.7 g. 1-phenyl-5-hydroxy-1,2,3,4-tetrahydro-naphthalene, 3.0 g. sodium hydroxide and 100 ml. acetone, the solution of 4.3 g. chloroacetic acid in 50 ml. acetone is added during 10 minutes. The mixture is then refluxed for 2½ hours, cooled to room temperature and filtered. The residue is dried, dissolved in 100 ml. water and the solution acidified with concentrated hydrochloric acid. The precipitate formed is filtered off and the filtrate extracted with ethyl acetate. The extract is dried, filtered, evaporated and the residue combined with the previously obtained filter cake. The whole is triturated with 300 ml. methanol and the suspension filtered to yield the (1 - phenyl - 1,2,3,4 - tetrahydro - 5-naphthoxy)-acetic acid of the formula

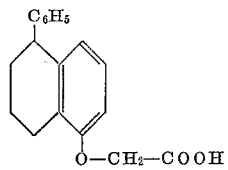

melting at 204–205°.

EXAMPLE 2

To the stirred mixture of 6.7 g. 1-phenyl-6-hydroxy-1,2,3,4-tetrahydro-naphthalene, 3.0 g. sodium hydroxide and 100 ml. acetone, the solution of 4.3 g. chloroacetic acid in 50 ml. acetone is added during 10 minutes. The mixture is then refluxed for 2½ hours, cooled to room temperature, diluted with 50 ml. acetone and filtered. The residue is dried, dissolved in 100 ml. water and the solution acidified with concentrated hydrochloric acid. The mixture is extracted with diethyl ether, the extract washed with water, dried, evaporated and the residue recrystallized from 95% aqueous ethanol to yield the (1-phenyl-1,2,3,4-tetrahydro-6-naphthoxy)-acetic acid of the formula

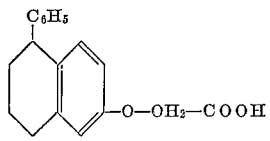

melting at 148–149°.

EXAMPLE 3

To the mixture of 7.4 g. 1-phenyl-5-hydroxy-1,2,3,4-tetrahydro-naphthalene, 100 ml. acetone and 8.5 g. sodium hydroxide, 3.36 ml. chloroform are added dropwise while stirring and refluxing. The mixture is refluxed for 2 hours during which time 100 ml. acetone are added to facilitate stirring. It is cooled to room temperature, filtered and the residue washed with acetone. The filtrate is evaporated in vacuo, the residue taken up in 100 ml. water and the mixture extracted with diethyl ether. The aqueous solution is acidified with hydrochloric acid, extracted with diethyl ether, the extract washed with water, dried, filtered and evaporated. The residue is taken up in hexane, the solution treated with charcoal, filtered and the filtrate allowed to crystallize to yield the 2-(1-phenyl-1,2,3,4-tetrahydro-5-naphthoxy)-isobutyric acid of the formula

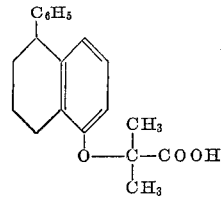

melting at 128–130°.

EXAMPLE 4

To the mixture of 9.0 g. 1-phenyl-6-hydroxy-1,2,3,4-tetrahydro-naphthalene, 9.6 g. sodium hydroxide and 100 ml. acetone, 3.84 ml. chloroform are added dropwise while stirring and refluxing. The mixture is refluxed for 3 hours during which time 200 ml. acetone are added portionwise in order to facilitate stirring. It is cooled to room temperature, filtered and the residue washed with acetone and dried. It is taken up in water, the solution acidified with concentrated hydrochloric acid and extracted with diethyl ether. The extract is washed with water, dried, filtered and evaporated. The residue is taken up in hexane, the solution treated with charcoal, filtered, evaporated, and the residue recrystallized from pentane-hexane and aqueous ethanol to yield the 2-(1-phenyl-1,2,3,4-tetrahydro-6-naphthoxy)-isobutyric acid of the formula

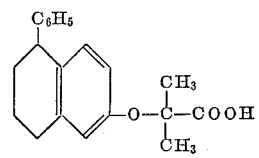

melting at 91–92°.

The starting material is prepared as follows: To the stirred suspension of 6.08 g. magnesium turnings in 50 ml. diethyl ether, the solution of 39.26 g. bromo-benzene in 100 ml. diethyl ether is added at such rate that the ice-cooled mixture is maintained at reflux. Hereupon it is refluxed until the whole magnesium is consumed. The mixture is cooled in an ice bath and the solution of 35.2 g. 6-methoxy-1-tetralone in 100 ml. diethyl ether and 50 ml. benzene are added during 20 minutes. The mixture is then stirred at room temperature for ½ an hour, refluxed for 2½ hours and allowed to stand over the weekend at room temperature. To the mixture 75 ml. 2 N-hydrochloric acid are added while cooling and stirring followed by 50 ml. water. The organic layer is separated, the aqueous solution extracted with diethyl ether, the extract combined with the organic layer, washed with water, dried and evaporated. The residue is recrystallized from pentane-hexane to yield the 1-hydroxy-1-phenyl-6-methoxy-1,2,3,4-tetrahydro-naphthalene melting at 67–70°.

45.8 g. thereof are dissolved in 350 ml. 95% aqueous ethanol containing 4.5 ml. concentrated hydrochloric acid. The mixture is refluxed for 5 minutes and allowed to stand in the refrigerator overnight. The precipitate formed is filtered off, the residue washed with aqueous ethanol and dried to yield the 1-phenyl-6-methoxy-3,4-dihydro-naphthalene melting at 70–71°.

The mixture of 14.0 g. thereof, 100 ml. glacial acetic acid and 1 g. 10% palladium-charcoal is hydrogenated at room temperature until 1,845 ml. hydrogen are consumed. It is filtered, the filtrate evaporated in vacuo, the residue taken up in hexane, the solution washed with water and aqueous sodium carbonate, dried, filtered and evaporated. The residue is distilled and the fraction boiling at 130–135°/0.1 mm. Hg collected; it represents the 1-phenyl-6 - methoxy - 1,2,3,4 - tetrahydro-naphthalene melting at 41–42°.

19.4 g. thereof are added to the melt, prepared from 200 ml. pyridine and 246 ml. concentrated hydrochloric acid, at about 200°. The mixture is refluxed for ½ an hour at about 250° and poured into 600 ml. cold water. The mixture is filtered, the residue taken up in diethyl ether, the solution washed with water, dried and evaporated. The residue is recrystallized from hexane-benzene and dried at 50° in vacuo to yield the 1-phenyl-6-hydroxy-1,2,3,4-tetrahydro-naphthalene melting at 113–114°.

The 1-phenyl-5-hydroxy-1,2,3,4 - tetrahydro - naphthalene, melting at 72–73°, is analogously prepared from equivalent amounts of the corresponding intermediates.

EXAMPLE 5

To the Grignard reagent, prepared from 2.5 g. magnesium turnings and 16 g. bromo-benzene in 100 ml. diethyl ether, cooled to about −25°, the solution of 29.2 g. ethyl 2-(1-oxo-1,2,3,4-tetrahydro-6 - naphthoxy) - isobutyrate in 100 ml. tetrahydrofuran are added dropwise while stirring. The mixture is allowed to warm up to room temperature and is stirred for 3 more hours. The complex formed is decomposed by the addition of saturated aqueous ammonium chloride, the organic layer separated, dried and evaporated under reduced pressure. The residue is taken up in diethyl ether, the solution acidified with one drop of concentrated hydrochloric acid, refluxed for 5 minutes, dried and evaporated. The residue is distilled and the fraction boiling at 160–180°/0.2 mm. Hg collected; it represents the ethyl 2-(1-phenyl-3,4-dihydro-6-naphthoxy)-isobutyrate of the formula

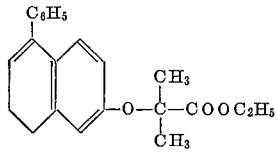

The starting material is prepared as follows: To the solution of 16.2 g. 6-hydroxy-1-tetralone in 300 ml. xylene, 2.3 g. sodium are added while heating and stirring. After the sodium is consumed, the mixture of 19.5 g. ethyl 2-bromo-isobutyrate in 50 ml. xylene are added portionwise and the mixture is refluxed for 6 hours. It is filtered, the filtrate evaporated in vacuo, the residue distilled and the fraction boiling at 100–120°/0.2 mm. Hg collected; it represents the ethyl 2-(1-oxo-1,2,3,4-tetrahydro-6-naphthoxy)-isobutyrate.

EXAMPLE 6

30 g. ethyl 2-(1-phenyl-3,4-dihydro-6-naphthoxy)-isobutyrate are hydrogenated in 100 ml. ethanol over 2.0 g. 10% palladium-charcoal until the theoretical amount of hydrogen is absorbed. The mixture is then filtered and the filtrate combined with the solution of 30 g. potassium hydroxide in 300 ml. methanol. The solution is refluxed for 2 hours and evaporated under reduced pressure. The residue is dissolved in 200 ml. water, the solution extracted with diethyl ether, the aqueous layer separated and acidified with concentrated hydrochloric acid. It is extracted with diethyl ether, the extract washed with water and brine, dried, filtered and evaporated. The residue is recrystallized from 95% aqueous ethanol to yield the 2-(1-phenyl-1,2,3,4-tetrahydro - 6 - naphthoxy)-isobutyric acid melting at 89–91°; it is identical with the product obtained according to Example 4.

EXAMPLE 7

The mixture of 10.5 g. 1-phenyl-7-hydroxy-1,2,3,4-tetrahydro-naphthalene, 250 ml. acetone and 18.0 g. sodium hydroxide is refluxed for 5 minutes, whereupon 7.2 ml. chloroform are added dropwise during 15 minutes while stirring. The mixture is refluxed for 1½ hours, cooled to room temperature and filtered. The residue is dissolved in 200 ml. water, the solution washed with diethyl ether, the aqueous layer separated and acidified with concentrated hydrochloric acid. The mixture is extracted with diethyl ether, the extract washed with water, dried, treated with charcoal, filtered and evaporated in vacuo. The residue is taken up in diethyl ether, the solution shaken with 50 ml. 10% sodium hydroxide, the aqueous layer separated and acidified with hydrochloric acid. It is extracted with diethyl ether, the extract washed twice with 100 ml. water, dried, filtered and evaporated. The residue is recrystallized from pentane and hexane to yield the 2-(1-phenyl-1,2,3,4-tetrahydro-7-naphthoxy)-isobutyric acid of the formula

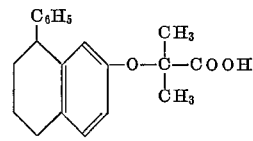

melting at 96–97°.

The starting material is prepared as follows: To the Grignard reagent, prepared from 3.1 g., activated magnesium and 20.5 g. bromo-benzene in 40 ml. diethyl ether, the solution of 20 g. 7-methoxy-1-tetralone in 100 ml. benzene is added slowly while stirring. The mixture is refluxed for 5 hours and allowed to stand at room temperature overnight. It is then cooled in an ice bath and 100 ml. 1 N hydrochloric acid are slowly added. The organic layer is separated, washed with water, dried, filtered and evaporated. The residue is distilled and the fraction boiling at 140–145/0.2 mm. Hg collected; it represents the 1-phenyl-7-methoxy-3,4-dihydro-naphthalene.

23.0 g. thereof are hydrogenated in 150 ml. glacial acetic acid over 2.0 g. 10% palladium on charcoal, until 2.37 liters hydrogen are consumed. The mixture is then filtered, the filtrate evaporated in vacuo, the residue taken up in diethyl ether, the solution washed with water and aqueous sodium bicarbonate, dried, filtered and evaporated. The residue is distilled and the fraction boiling at 125–150°/0.2 mm. Hg collected. It is recrystallized from pentane, to yield the 1-phenyl-7-methoxy-1,2,3,4-tetrahydronaphthalene melting at 55–56°.

14.0 g. thereof are added to the melt, prepared from 125 ml. pyridine and 155 ml. concentrated hydrochloric acid, at about 200° and the mixture is refluxed for 30 minutes. It is poured into 500 ml. cold water, the precipitate formed filtered off and taken up in diethyl ether. The solution is washed with water, dried, evaporated and the residue recrystallized from benzene-pentane, to yield the 1-phenyl-7-hydroxy-1,2,3,4-tetrahydro-naphthalene melting at 108–109°.

EXAMPLE 8

The mixture of 22 g. 1-(4-chloro-phenyl)-5-hydroxy-1,2,3,4-tetrahydro-naphthalene, 200 ml. acetone and 30.6 g. sodium hydroxide is refluxed for 5 minutes, whereupon 12.3 ml. chloroform are added during 10 minutes while stirring. The mixture is refluxed for 1 hour, then cooled in an ice bath and filtered. The residue is taken up in 200 ml. water, the solution acidified with concentrated hydrochloric acid, extracted with diethyl ether, the extract washed with water, dried and evaporated. The residue is recrystallized from benzene-hexane with the aid of charcoal, to yield the 2-[1-(4-chloro-phenyl)-1,2,3,4-tetrahydro-5-naphthoxy]-isobutyric acid of the formula

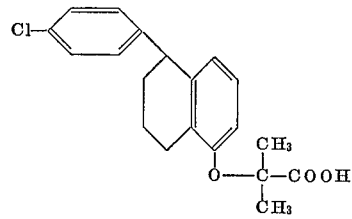

melting at 155–156°.

The starting material is prepared as follows: To the Grignard reagent, prepared from 9.6 g. activated magnesium and 76.6 g. 4-chloro-bromobenzene in 250 ml. diethyl ether, the solution of 54 g. 5-methoxy-tetralone in 100 ml. benzene and 100 ml. diethyl ether is added during 15 minutes. The mixture is then refluxed for 3 hours and allowed to stand overnight at room temperature. It is cooled in an ice bath and 300 ml. 1 N hydrochloric acid are added, followed by some ethyl acetate in order to facilitate separation. The organic layer is separated, washed with water, dried and evaporated. The residue is distilled and the fraction boiling at 151–175°/0.25 mm. Hg collected. It is recrystallized from pentane, to yield the 1-(4-chloro-phenyl)-5-methoxy-3,4-dihydro-naphthalene melting at 67–68°.

The mixture of 55.5 g. thereof, 250 ml. glacial acetic acid and 2.0 g. 10% palladium on charcoal is hydrogenated until 5.23 liters hydrogen are consumed. The suspension obtained is heated, diluted with ethanol in order to dissolve the precipitate formed, and filtered hot. The filtrate is cooled, the precipitate formed filtered off, the residue taken up in benzene-diethyl ether, the solution washed with water and aqueous sodium bicarbonate, dried and evaporated. The residue is recrystallized from benzene-pentane, to yield the 1-(4-chloro-phenyl)-5-methoxy-1,2,3,4-tetrahydro-naphthalene melting at 102–103°.

27.3 g. thereof are heated with the melt, obtained from 242 ml. pyridine and 300 ml. concentrated hydrochloric acid, to about 255–265° for 30 minutes. The mixture is then poured into ice water, the whole extracted with diethyl ether, the extract dried, filtered and evaporated. The residue is recrystallized from hexane-diethyl ether, to yield the 1-(4-chloro-phenyl)-5-hydroxy,1,2,3,4-tetrahydro-naphthalene melting at 97–98°.

EXAMPLE 9

To the mixture of 9.3 g. 2-(1-phenyl-1,2,3,4-tetrahydro-5-naphthoxy)-isobutyric acid, 20 ml. dimethylformamide and 20 ml. toluene, 1.4 g. of 56% sodium hydride in mineral oil are added while stirring and cooling in an ice bath. Hereupon, the mixture of 4.2 g. 2-diethylamino-ethyl chloride and 17 ml. toluene is added and the mixture stirred at room temperature for 3 hours and refluxed for 2 hours. After standing at room temperature overnight, water is added and the mixture extracted with diethyl ether. The extract is dried, filtered and evaporated in vacuo, whereby the temperature is allowed to rise up to 180°/0.2 mm. Hg. The residue is taken up in a hot solution of 6.0 g. citric acid in methyl-ethyl ketone. The precipitate formed is filtered off and recrystallized from acetone, to yield the 2-diethylamino-ethyl 2-(1-phenyl-1,2,3,4-tetrahydro-5-naphthoxy)-isobutyrate citrate of the formula

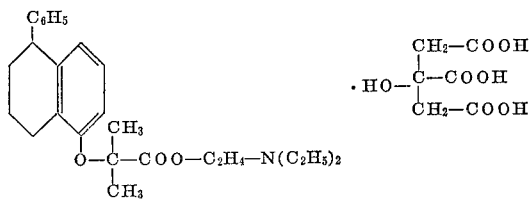

melting at 100–102°.

EXAMPLE 10

To the refluxing mixture of 12.0 g. 2-phenyl-6-hydroxy-1,2,3,4-tetrahydro-naphthalene, 100 ml. acetone and 15.0 g. sodium hydroxide, the mixture of 10.0 g. chloroform and 10 ml. acetone is added dropwise while stirring. After diluting it with 100 ml. more acetone, it is refluxed for ½ an hour, cooled and filtered. The residue is washed with acetone, dissolved in 300 ml. water and the solution acidified with concentrated hydrochloric acid. The precipitate formed is filtered off and recrystallized first from benzene-hexane and then from 95% ethanol, to yield the 2-(2-phenyl-1,2,3,4-tetrahydro-6-naphthoxy)-isobutyric acid of the formula

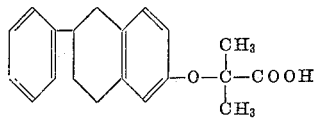

melting at 163–165°.

The starting material is prepared as follows: To the solution of 30 g. 2-phenyl-6-methoxy-tetralone in 250 ml. ethanol and 250 ml. tetrahydrofuran, 4.0 g. sodium borohydride are added portionwise and the mixture stirred at about 50° overnight. After cooling, hydrochloric acid and methylene chloride are added while stirring, the organic layer separated, dried, filtered and evaporated, to yield the 2-phenyl-6-methoxy-3,4-dihydro-naphthalene melting at 108–110°.

The mixture of 18.0 g. thereof, 250 ml. glacial acetic acid, 50 ml. ethyl acetate and 1.0 g. 10% palladium on charcoal is hydrogenated until the hydrogen uptake ceases (10 minutes). The mixture is filtered, the filterate evaporated in vacuo and the residue recrystallized from 95% ethanol, to yield the 2-phenyl-6-methoxy-1,2,3,4-tetrahydro-naphthalene melting at 87–88°.

15 g. thereof are heated with the melt, prepared from 150 ml. pyridine and 150 ml. concentrated hydrochloric acid, to about 260° for 30 minutes. The mixture is taken up in water, containing 10 ml. concentrated hydrochloric acid, and extracted with ethyl acetate, diethyl ether and benzene. The combined extracts are dried, filtered and evaporated in vacuo. The residue is triturated with pentane and filtered off, to yield the 2-phenyl-6-hydroxy-1,2,3,4-tetrahydro-naphthalene melting at 84–85°.

EXAMPLE 11

Preparation of 10,000 tablets each containing 100.0 mg. of the active ingredient:

| Formula: | G. |
|---|---|
| 2-(1-phenyl-1,2,3,4-tetrahydro-5-naphthoxy) isobutyric acid | 1,000.00 |
| Lactose | 2,535.00 |
| Corn starch | 125.00 |
| Polyethylene glycol 6,000 | 150.00 |
| Talcum powder | 150.00 |
| Magnesium stearate | 40.00 |
| Purified water, q.s. | |

Procedure.—All the powders are passed through a screen with an opening of 0.6 mm. Then the drug substance, lactose, talcum, magnesium stearate and half of the starch are mixed in a suitable mixer. The other half of the starch is suspended in 65 ml. water and the suspension added to the boiling solution of the polyethylene glycol in 260 ml. water. The paste formed is added to the powders which are granulated, if necessary, with an additional amount of water. The granulate is dried overnight at 35°, broken on a screen with 1.2 mm. openings and compressed into tablets using concave punches with 10.3 mm. diameter, uppers bisected.

In the analogous manner tablets are prepared, comprising about 50 to 300 mg. of the compounds described in the previous and following examples.

EXAMPLE 12

To the Grignard reagent, prepared from 20.0 g. 4-bromoanisol and 2.5 g. magnesium turnings in 100 ml. diethyl ether, the solution of 29.2 g. ethyl 2-(1-oxo-1,2,3,4-tetrahydro-5-naphthoxy)-isobutyrate in 100 ml. benzene is added during 20 minutes while stirring and cooling in an ice bath. Hereupon the mixture is slowly heated and refluxed for 3 hours. After cooling 100 ml. 2 N-hydrochloric acid are added, the organic layer separated, washed with water and brine, dried, filtered and evaporated. The residue is distilled and the fraction boiling at 160–200°/0.1 mm. Hg collected; it represents the ethyl 2-[1-(4-methoxy-phenyl) - 3,4 - dihydro - 5-naphthoxy]-isobutyrate of the formula

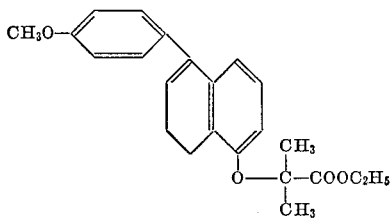

The starting material is prepared as follows: To the solution of 16.2 g. 5-hydroxy-1-tetralone in 150 ml. xylene, 2.3 g. sodium are added while stirring and the mixture is refluxed until all sodium is consumed. Hereupon 19.5 g. ethyl 2-bromo-isobutyrate are slowly added and refluxing is resumed for 6 hours. After cooling, 10 ml. ethanol are added, the mixture is filtered and the filtrate evaporated in vacuo. To the residue water and diethyl ether are added, the organic layer is separated, dried, filtered and evaporated. The residue is distilled and the fraction boiling at 80–120°/0.1 mm. Hg collected; it represents the ethyl 2-(1-oxo - 1,2,3,4-tetrahydro-5-naphthoxy)-isobutyrate.

EXAMPLE 13

The solution of 20 g. ethyl 2-[1-(4-methoxy-phenyl)-3,4-dihydro - 5-naphthoxy]-isobutyrate in 200 ml. ethanol is hydrogenated at room temperature over 2.0 g. 10% palladium on charcoal, until the theoretical amount of hydrogen is absorbed. The mixture is then filtered, the filtrate evaporated in vacuo, the residue distilled and the fraction boiling at 170–200°/0.1 mm. Hg collected; it represents the ethyl 2-[1-(4-methoxy-phenyl)-1,2,3,4-tetrahydro - 5-naphthoxy]-isobutyrate of the formula

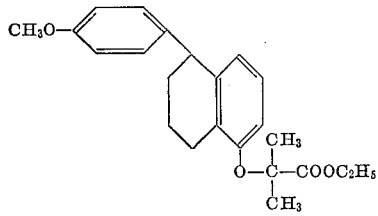

showing in the I.R.-spectrum inter alia bands at 1710, 1260, 825 and 760 cm.$^{-1}$.

EXAMPLE 14

To 10.0 g. ethyl 2-[3-(3-benzoyl-propyl)-phenoxy]-isobutyrate 100 ml. 80% sulfuric acid are slowly added at —20° while stirring, whereupon the temperature is allowed to rise to room temperature. The mixture is then poured over ice, the whole extracted with diethyl ether, the extract washed with water and aqueous sodium bicarbonate, dried, filtered and evaporated. The residue is distilled an the fraction boiling at 160–180°/0.2 mm. Hg collected; it represents the ethyl 2-(1-phenyl-3,4-dihydro-6-naphthoxy)-isobutyrate, which is identical with that obtained according to Example 5.

The starting material is prepared as follows: The mixture of 19.4 g. γ-(3-methoxy-phenyl)-butyric acid, 36 g. thionyl chloride and 100 ml. benzene is refluxed for 3 hours and evaporated in vacuo. To the residue, 50 ml. benzene are added three times and each time removed in vacuo, to yield the corresponding acid chloride.

To the Grignard reagent prepared from 23.5 g. bromobenzene, 3.6 g. magnesium turnings and 100 ml. diethyl ether, 200 ml. benzene are added, whereupon 150 ml. of the solvent are removed by distillation. To the concentrate, 36.6 g. cadmium chloride are added and the mixture stirred and refluxed for 3 hours. To the resulting mixture containing phenyl-cadmium chloride, the solution of the previously prepared γ-(3-methoxy-phenyl)-butyric acid chloride in 50 ml. benzene is added dropwise while stirring and cooling. Hereupon the reaction mixture is slowly heated to 50° and stirred for 2 hours at this temperature. After cooling, 100 ml. 2 N hydrochloric acid are added dropwise while stirring and cooling, the organic layer is separated, washed with water, dried, filtered and evaporated. The residue is distilled and the fraction boiling at 80–110°/0.1 mm. Hg collected; it represents the γ-(3-methoxyphenyl)-butyrophenone.

29 g. thereof are added to 150 ml. boiling pyridine hydrochloride melt and the mixture is kept for 30 minutes at about 250°. It is then poured into ice water, the mixture extracted with diethyl ether, the extract washed with water, dried and evaporated to yield the γ-(3-hydroxy-phenyl)-butyrophenone.

To the mixture of 22.8 g. thereof and 200 ml. xylene, 2.3 g. sodium are added in pieces while refluxing and stirring for 3 hours. After the sodium has been consumed, 19.5 g. ethyl 2-bromoisobutyrate are slowly added and the mixture is refluxed for 6 hours. It is filtered, the filtrate evaporated in vacuo, the residue distilled and the fraction boiling at 180–210°/0.1 mm. Hg collected; it represents the ethyl 2-[3-(3-benzoyl-propyl)-phenoxy]-isobutyrate.

EXAMPLE 15

The solution of 36 g. ethyl 2-(1-oxo-2-phenyl-1,2,3,4-tetrahydro - 6 - naphthoxy)isobutyrate in the minimum amount of ethanol is hydrogenated over 2.0 g. 20% palladium on charcoal at atmospheric pressure and room temperature, until the theoretical amount of hydrogen has been consumed. The mixture is then filtered, the filtrate evaporated, the residue distilled and the fraction boiling at 160–180°/0.1 mm. Hg collected; it represents the ethyl 2-(2-phenyl-1,2,3,4-tetrahydro-6-naphthoxy)-isobutyrate of the formula

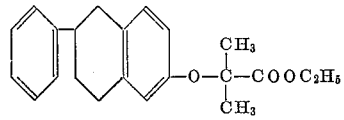

The mixture of 20 g. thereof and 200 ml. 6 N ethanolic potassium hydroxide is refluxed for 5 hours and concentrated in vacuo. The concentrate is diluted with water, extracted with diethyl ether, the aqueous layer separated and acidified with hydrochloric acid. The precipitate formed is filtered off and recrystallized from aqueous ethanol, to yield the corresponding free acid, melting at 163–165°; it is identical with that obtained according to Example 10.

The starting material is prepared as follows: 25.2 g. 2-phenyl-6-methoxy-tetralone are added to the melt, obtained from 242 ml. pyridine and 200 ml. concentrated hydrochloric acid, at about 255° and the mixture is kept at this temperature for 30 minutes. It is poured into ice water, extracted with ethyl acetate, the extract washed with water, dried and evaporated to yield the 2-phenyl-6-hydroxy-tetralone.

21.4 g. thereof are taken up in 200 ml. xylene and 2.3 g. sodium are added while stirring and refluxing for 2 hours. After the sodium has been consumed, 16 g. ethyl 2-bromo-isobutyrate are added and the mixture is stirred and refluxed for 6 hours. It is evaporated in vacuo, the residue taken up in water and the mixture extracted with diethyl ether. The extract is washed with water, dried, filtered and evaporated, to yield the ethyl 2-(1-oxo-2-phenyl-1,2,3,4-tetrahydro-6-naphthoxy)-isobutyrate.

What is claimed is:
1. A tricyclic phenoxy-acid having the formula

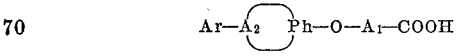

in which $A_1$ is alkylene with up to 4 carbon atoms, $A_2$ is 1,4-butylene or 1,4-butenylene carrying Ar in one of its 1- or 2-positions, Ph is 1,2-phenylene or (lower alkoxy)-1,2-phenylene, and Ar is phenyl, (lower alkoxy)- phenyl or (halogeno)-phenyl, the lower alkyl or dilower alkylamino-lower alkyl esters thereof in which the amino nitrogen atom is separated from the oxy oxygen atom of the carbonyloxy group by at least 2 carbon atoms, or an ammonium or alkali metal salt of the acid or a therapeutically useful acid addition salt of the di-lower alkyl-amino-lower alkyl ester.

2. A compound as claimed in claim 1 and having the formula

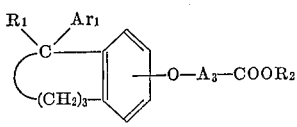

in which $A_3$ is methylene or 2,2-propylene, $R_1$ is hydrogen, $Ar_1$ is phenyl, (methoxy)-phenyl or (chloro)-phenyl and $R_2$ is hydrogen, methyl, ethyl or 2-diethylaminoethyl, an ammonium or alkali metal salt of the acid or a therapeutically acceptable acid addition salt of the 2-diethylaminoethyl ester.

3. A compound as claimed in claim 2, in which formula $A_3$ is methylene or 2,2-propylene, each of $R_1$ and $R_2$ is hydrogen and $Ar_1$ is phenyl, 4-methoxyphenyl or 4-chlorophenyl, its lower alkyl esters, alkali metal or ammonium salts.

4. A compound as claimed in claim 2 and being the (1 - phenyl - 1,2,3,4 - tetrahydro - 5 - naphthoxy) - acetic acid.

5. A compound as claimed in claim 2 and being the (1 - phenyl - 1,2,3,4 - tetrahydro - 6 - naphthoxy) - acetic acid.

6. A compound as claimed in claim 2 and being the 2 - (1 - phenyl - 1,2,3,4 - tetrahydro- 5 - naphthoxy) - isobutyric acid.

7. A compound as claimed in claim 2 and being the 2 - (1 - phenyl - 1,2,3,4-tetrahydro - 6 - naphthoxy) - isobutyric acid.

8. A compound as claimed in claim 2 and being the ethyl 2 - (1 - phenyl - 3,4 - dihydro - 6 - naphthoxy)-isobutyrate.

9. A compound as claimed in claim 2 and being the 2 - (1 - phenyl - 1,2,3,4 - tetrahydro - 7 - naphthoxy)-isobutyric acid.

10. A compound as claimed in claim 2 and being the 2 - [1 - (4 - chloro - phenyl) - 1,2,3,4 - tetrahydro - 5-naphthoxy]-isobutyric acid.

11. A compound as claimed in claim 2 and being the 2 - diethylamino - ethyl 2 - (1 - phenyl - 1,2,3,4 - tetrahydro-5-naphthoxy)-isobutyrate citrate.

12. A compound as claimed in claim 1 and being the ethyl 2 - [1 - (4 - methoxy - phenyl) - 3,4 - dihydro - 5-naphthoxy]-isobutyrate.

13. A compound as claimed in claim 2 and being the ethyl 2 - [1 - (4 - methoxy - phenyl) - 1,2,3,4 - tetrahydro-5-naphthoxy]-isobutyrate.

14. A compound as claimed in claim 1 and having the formula

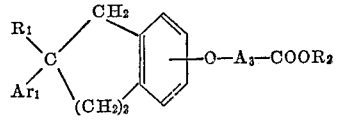

in which $A_3$ is methylene or 2,2-propylene, $R_1$ is hydrogen, $Ar_1$ is phenyl, (methoxy)-phenyl or (chloro)-phenyl, and $R_2$ is hydrogen, methyl, ethyl or 2-diethylaminoethyl, an ammonium or alkali metal salt of the acid or a therapeutically acceptable acid addition salt of the 2-diethylaminoethyl ester.

15. A compound as claimed in claim 14, in which formula $A_3$ is methylene or 2,2-propylene, each of $R_1$ and $R_2$ is hydrogen and $Ar_1$ is phenyl, 4 - methoxyphenyl or 4-chloro-phenyl, its lower alkyl esters, alkali metal or ammonium salts.

16. A compound as claimed in claim 14 and being the 2 - (2 - phenyl - 1,2,3,4 - tetrahydro - 6 - naphthoxy)-isobutyric acid or its ethyl ester.

References Cited

UNITED STATES PATENTS 3,347,910  10/1967  Bolhofer et al. _____ 260—520
3,243,441   3/1966  Ritter et al. _____ 260—520

LORRAINE A. WEINBERGER, Primary Examiner

D. E. STENZEL, Assistant Examiner

U.S. Cl. X.R.

260—247.2, 294.3, 268, 326.3, 347.4, 332.2, 520; 424—308, 317